March 24, 1953 P. D. BECKER 2,632,355
FLANGED NUT
Filed March 18, 1949
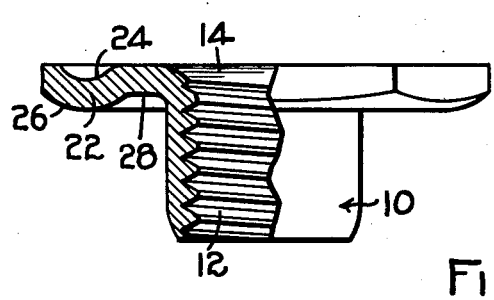
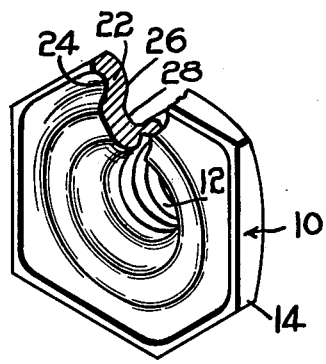
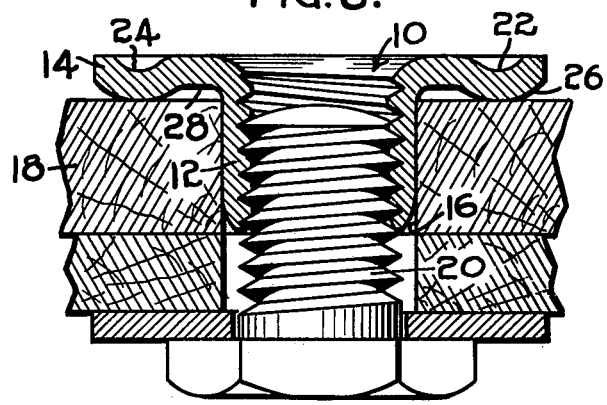
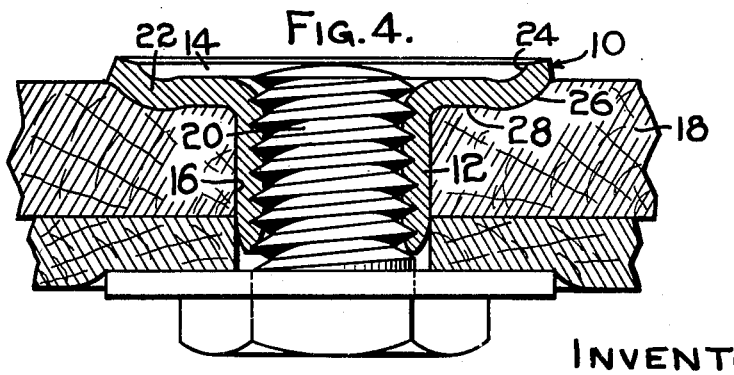
INVENTOR:
PHILIP D. BECKER,
BY John Todd
ATTORNEY.

Patented Mar. 24, 1953

2,632,355

UNITED STATES PATENT OFFICE 2,632,355

FLANGED NUT

Philip D. Becker, Hingham, Mass., assignor to United-Carr Fastener Corporation, Cambridge, Mass., a corporation of Massachusetts Application March 18, 1949, Serial No. 82,179

1 Claim. (Cl. 85—32)

This invention relates generally to threaded nuts and has particular reference to a flanged nut adapted to engage a bolt disposed through a panel of wood, sheet metal or the like.

Nuts for such applications are commonly provided with a threaded shank to extend into an opening in the panel to engage a bolt, and a base or flange disposed about the shank to provide a large surface for bearing against the panel when the nut is forced thereagainst by tightening the bolt in the shank. The outer periphery of the flange is frequently formed into the shape of a hexagon or square to enable the nut to be engaged by a driving tool.

Nuts of this type are commonly used in assembling panels where it is desirable that the nut project a minimum distance beyond the panel to which it is applied, and for this reason the base or flange should be relatively thin, but at the same time must be sufficiently strong to withstand stresses caused by tightening of the bolt. Thus, in certain installations, nuts of the prior art are subject to a number of disadvantages. During tightening of the bolt in such nuts, the center of the flange tends to be pulled into the hole and the outer periphery of the flange tends to turn upwardly away from the panel. To obtain the tension necessary to retain the panels in assembly, it is frequently necessary to cause considerable deformation of the flange. Where the nut is being permanently assembled on a sheet metal panel, the deformation of the flange causes the outer periphery to project from the panel further than is desired, and also imparts an unsightly appearance to the nut. When the nut is being applied to a temporary structure such as in the assembly of wooden packing cases, the deformation of the nut not only causes an unsightly appearance, but renders the nut unfit for further use, since the cone shape which is imparted to the flange by the deformation makes it impossible to engage the periphery with a driving tool and in any case, the deformed nut would be drawn an excessive distance into the wood.

The object of the invention is to provide a threaded nut having a supporting panel-engaging flange of improved construction, which is capable of withstanding high stresses without substantial deformation.

A further object of the invention is to provide a threaded nut having a panel-engaging flange in which the flange is shaped and arranged to permit substantial deformation under high stresses without impairing the appearance of the nut.

A further object of the invention is to provide a flanged nut having a panel-engaging flange shaped and arranged to permit controlled deformation in a predetermined portion thereof when a high stress is applied to the nut.

A further object of the invention is to provide a nut having a panel-engaging flange with an outer periphery adapted for engagement with a driving tool, in which the flange is shaped and arranged to allow controlled deformation of a center portion without deformation of the outer periphery.

Other objects of the invention will, in part, be obvious, and will, in part, appear hereinafter. For a fuller understanding of the nature and objects of the invention, reference should be had to the following detailed description, taken in conjunction with the accompanying drawing, in which—

Fig. 1 is a view in elevation, partly in section, of a nut embodying the features of the invention;

Fig. 2 is a perspective view, partly in section, of the nut of Fig. 1;

Fig. 3 is a view in elevation, partly in section, of the nut and a cooperating bolt in assembly with a panel of compressible material; and Fig. 4 is a view similar to that of Fig. 3, illustrating the deformation imparted to the nut by tightening of the bolt therein.

Referring to the drawing, there is illustrated a flanged nut 10, which comprises an internally threaded shank 12, and a base or flange 14 disposed about the shank at one end thereof. The shank 12 is adapted for assembly in an opening 16 in a supporting panel 18, for engagement with a threaded bolt 20. The flange 14 provides a large bearing surface to support the nut 10 when the nut is drawn against the panel by tightening of the bolt 20, and is provided with an embossed portion 22 disposed about the shank, which provides a circular channel 24 on the upper side of the flange, and a raised ring 26 on the lower or panel-bearing side of the flange.

The embossed portion 22 is preferably spaced apart from the shank 12 a predetermined distance, to provide a deformable portion 28 disposed about the shank immediately adjacent thereto. The outer periphery of the flange is shaped to enable it to be engaged by a driving tool (not shown), and by reason of the raised ring 26, is spaced apart from the panel 18 when the nut is assembled thereon, to facilitate engagement of the nut by the tool.

The shape of the embossment and the cold work imparted thereto by the embossing operation imparts added strength to the flange to resist deformation caused by the forcing of the flange against the panel. However, the increase of strength of the flange, while a desirable feature, is not the principal advantage obtained by the embossing, since in the majority of assembly operations the bolt and nut are placed under sufficient tension to considerably exceed the elastic limit of the flange. The major advantage of the embossing is the effect on the way in which the flange deforms under high stresses. Since the nut is ordinarily made by punching and drawing operations performed on sheet metal, the metal of the flange portion is not subjected to appreciable cold work until the embossing operation is preformed, and the cold work imparted by this operation affects only the embossed portion. Therefore, the completed flange comprises a relatively unworked inner ring (the deformable portion 28) which is surrounded by a stronger cold worked ring (the embossed potrion 22).

The effect of a high stress on a flange of this construction is best illustrated by Fig. 4. As the elastic limit of the flange is exceeded by tension applied to the nut, the deformable portion 28, which is originally spaced apart from the panel, is pulled downwardly as the shank 12 is pulled into the opening 16, and the deformation of the nut is thereby confined to the area immediately adjacent the shank.

Although sufficient stress can, under test conditions, be imparted to the nut to cause deformation of the entire flange, such tests have shown that stresses of this magnitude also cause rupture or severe deformation of the shank, or stripping of the threads in the shank.

The device is economical to manufacture, since only minor modifications are necessary in the machinery ordinarily used for making such nuts. Suitable projections may be provided on the flange to prevent rotation of the nut during installation, in the usual manner.

Since certain obvious modifications may be made in the device without departing from the scope of the invention, it is intended that all matter contained herein be interpreted in an illustrative and not in a limiting sense.

I claim:

A flanged sheet metal nut comprising a tubular internally threaded shank and a laterally extending flange at one end thereof providing a work-bearing surface surrounding and facing the opposite end of said shank, the outer portion of said flange being embossed to provide a rigid annular outer peripheral portion having a relatively flat surfaced polygonal tool-engaging peripheral edge, and said flange having an annular non-resilient deformable section interconnecting said tubular shank and embossed outer peripheral flange portion, the flat surfaced peripheral edge being of substantially the same thickness as the intermediate deformable portion and normally disposed in the same plane thereof, the embossed outer peripheral portion of said flange including a circumferential reinforcing rib of arcuate cross section on the work bearing side of said flange extending from the outer peripheral edge inwardly to the non-resilient deformable section providing a rigid arcuate work-engaging bearing spaced axially from the polygonal peripheral edge faces of the flange and the adjoining surface of the deformable section and serving to reinforce the embossed peripheral portion of said flange against deformation while permitting deformation of the deformable flange section axially of said shank to substantially the plane of the rigid arcuate work-engaging bearing.

PHILIP D. BECKER.

REFERENCES CITED

The following references are of record in the file of this patent:

UNITED STATES PATENTS

| Number | Name | Date |
|---|---|---|
| 680,991 | Crosby | Aug. 20, 1901 |
| 1,088,641 | Webster | Feb. 24, 1914 |
| 1,679,844 | Volckhausen | Aug. 7, 1928 |
| 2,160,374 | Veillette | May 30, 1939 |
| 2,265,661 | Luce | Dec. 9, 1941 |
| 2,389,122 | Churchill | Nov. 20, 1945 |